United States Patent
Kageler et al.

(10) Patent No.: US 7,134,364 B2
(45) Date of Patent: Nov. 14, 2006

(54) BATTERY-DRIVEN SCREWDRIVER

(75) Inventors: Sven Kageler, Leinfelden-Echterdingen (DE); Ginn Yuh Gan, Penang (MY); Abdul Aziz Zulfikar, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/550,407

(22) PCT Filed: Jul. 24, 2004

(86) PCT No.: PCT/DE2004/001656

§ 371 (c)(1),
(2), (4) Date: Sep. 21, 2005

(87) PCT Pub. No.: WO2005/039829

PCT Pub. Date: May 6, 2005

(65) Prior Publication Data

US 2006/0213333 A1    Sep. 28, 2006

(30) Foreign Application Priority Data

Sep. 29, 2003  (DE) ................. 103 45 136

(51) Int. Cl.
*B25B 23/00* (2006.01)
(52) U.S. Cl. ............... 81/52; 81/54; 173/216; 173/217; 310/50
(58) Field of Classification Search ............. 81/52, 81/54, 451, 452, 456; 173/216, 217; 310/50
See application file for complete search history.

(56) References Cited

U.S. PATENT DOCUMENTS

| 3,369,615 | A | | 2/1968 | Maffey |
| 4,078,589 | A | * | 3/1978 | Miller .................. 81/57.14 |
| 4,493,223 | A | | 1/1985 | Kishi et al. |
| 4,739,242 | A | | 4/1988 | McCarty et al. |
| 4,751,452 | A | * | 6/1988 | Kilmer et al. .............. 320/106 |
| 5,054,563 | A | * | 10/1991 | Zapf .................... 173/217 |
| 6,102,134 | A | * | 8/2000 | Alsruhe ................. 173/217 |
| 6,106,971 | A | | 8/2000 | Sponitz |
| 6,144,122 | A | * | 11/2000 | Covell et al. ............. 310/50 |
| 6,364,033 | B1 | * | 4/2002 | Hung et al. ............. 173/217 |
| 6,776,069 | B1 | * | 8/2004 | Soreo et al. ............ 81/54 |
| 2003/0094294 | A1 | | 5/2003 | Fritz |

FOREIGN PATENT DOCUMENTS

| EP | 0 899 066 A2 | 3/1999 |
| EP | 1 066 930 A2 | 1/2001 |
| EP | 1 266 725 A1 | 12/2002 |
| EP | 1 314 518 A1 | 5/2003 |
| JP | 09047982 | 2/1997 |

* cited by examiner

*Primary Examiner*—Lee D. Wilson
*Assistant Examiner*—Anthony Ojini
(74) *Attorney, Agent, or Firm*—Michael J. Striker (57) ABSTRACT

A battery-operated screwdriver (10) with a housing (12, 18) with a grip (14), in particular with a fixedly built-in battery (40), and with charging contact tongues (37) for charging the battery (40), is designed as especially compact and lightweight because instead of a boxlike, standard ON/OFF switch, counterpart contacts (34) fixed to the tool are provided, to which a contact plate (32) that is movable by means of an ON/OFF trigger (26) and in the process is coupleable to the counterpart contacts (34) and upon their release is easily releasable, is assigned.

13 Claims, 10 Drawing Sheets

BATTERY-DRIVEN SCREWDRIVER

PRIOR ART

The present invention is based on a battery-operated screwdriver as generically defined by the preamble to claim 1.

Battery-operated screwdrivers with a power classification of between 2.4 V and 3.6 V are known, for instance from European Patent Disclosure EP 1 066 930. They usually have a plurality of Ni—Cd cells as energy storing means, an ON/OFF switch with a short pushbutton, and without continuously variable rpm regulation and with a switch for reversing from counterclockwise to clockwise rotation, a gear that steps down the motor rpm, in particular a planetary gear, and a motor with a standard diameter of 27.5 mm. There are also rod-shaped and pistol-shaped versions, and versions with an adjustable-angle grip. For being charged, these devices are either connected to the charger device via a plug—as in the case of a cell phone or electric shaver—or via a mount with contacts into which the device is placed. The mounts can be secured to a wall, for instance, to make handling during charging easier.

To do this, the charging mode for the charger and for the electrical connection must first be established, but this does not happen automatically after every use. As a result, the device is often not ready for use precisely when it is needed, and the familiar memory effect is a further disadvantage. Ni—Cd cells discharge after a certain time unless power is supplied, and even unused battery-operated screwdrivers are soon partly discharged. If they are recharged because they have been partly discharged, then because of the memory effect, after the charging operation, only the difference amounting to the new charging amount is available—and hence only reduced power is available.

Another disadvantage of the known battery-operated screwdrivers is their volumetric size, because they contain large structural components, such as the gear, the switch system, and the battery in the form of Ni—Cd cells, whose size known as "⅘ Sub-C", when located in the grip, impairs both ergonomics and usability, since narrow, angled screwing locations are inaccessible.

ADVANTAGES OF THE INVENTION

By the use of only a single long, slender lithium-ion (Li-ion) cell, fixedly built into the grip of the battery-operated screwdriver, instead of a plurality of ⅘ Sub-C nickel-cadmium cells as a battery, an especially small grip circumference can be attained. A markedly reduced, extremely handy structural size of the "lady's revolver format" is moreover attained by replacing a conventional, boxlike switch unit with a contact plate that takes up only about 10% of the volume of the switch unit and is connected to the ON/OFF trigger and electrically connects two counterpart contacts to one another upon displacement of the button. For this purpose, the contact plate is screwed into the ON/OFF trigger.

Two relatively large, hard spiral springs keep the ON/OFF trigger prestressed in its OFF position, and by rapid opening and closing of the contacts, given the high impedance that increases over the service life, prevent it from being fused to the contact plate.

The especially long ON/OFF trigger, extending over nearly the entire inside of the grip, has a short actuation stroke, and as a result is especially easily actuatable at any arbitrary point in a way that reliably switches ON the motor.

As a result—regardless of the actuation position—only slight user forces are necessary, and the device can be conveniently switched ON in virtually any position of the user's hand. To improve the guidance of the ON/OFF trigger relative to the housing, the ON/OFF trigger has two lateral guide tongues on its inside, which are braced in the housing in a slidingly supported way.

A further volumetric reduction of the battery-operated screwdriver is attained by means of the compact design of the gear and the gearbox; the gear, as a planetary gear, is merely placed in the cylindrical gearbox and is kept from falling out by an axial securing plate. The gearbox internal toothing serves itself as a sun wheel.

Because the end of the motor shaft associated with the gear has a flat face, and the corresponding engagement opening of the gear input shaft has the complementary negative shape, a simple, easily assembled compact coupling between the motor and the gear is created, which also allows course tolerances and functions reliably.

Because the motor housing is composed of half-shells split in the middle, which in tonglike fashion embrace the cylindrical gearbox from both sides with radially inward-protruding support tongues and keep it centered in the assembly position, the gearbox can be joined precisely and securely to the motor housing without separate fastening or guide elements such as screws, centering pins, or overlooking elements.

A further reduction in weight and volume of the battery-operated screwdriver is attained by omitting a chuck; by means of a hexagonal socket of the power takeoff shaft—fitting corresponding screw or bore bits with a hexagonal shank—these tools can be changed quickly and simply.

Since the lithium-ion cell has almost no self-discharge, the battery-operated screwdriver is fully ready for use even after long intervals between uses; in intervals between uses, the battery-operated screwdriver can rest for an arbitrarily long time on the charging shell in the charging mode. The charging shell can be placed, standing securely, on a level shelf and need not be secured or firmly held when the battery-operated screwdriver is removed. As a result, it can always be removed quickly with only one hand; no plug has to be unplugged and no mount has to be removed. Moreover, it is automatically assured at all times that the battery-operated screwdriver is charged.

The compact lithium-ion cell sits without play, positionally secured and braced, in the interior of the half-shell-like grip regions, and contact lugs with electric lead lines are soldered by their end regions to the circuit board. The lithium-ion cell is integrated into the strength structure the grip and increases its dimensional stability while using only little material for the half-shells of the housing.

The circuit board intended for control is the chassis for the turn-on contacts, the charging contact tongues, the slide switch for reversing the direction, and the two light-emitting diodes for indicating the direction of rotation, and the control means for the charging and discharging current of the lithium-ion cell. The circuit board is also located longitudinally in the interior of the grip, in the form of an additional crosswise rib integrated into the strength structure of the housing or grip, and increases the bending strength of the housing or grip considerably.

Instead of a boxlike ON/OFF switch that is typical in this class, which has one position each for clockwise and counterclockwise operation, the concept of a separate clockwise/counterclockwise preselection was adopted. While in previous drilling screwdrivers, a separate structural group is placed for this purpose on the boxlike mains switch, in the present case a simpler and less-expensive slide switch, which is soldered onto the circuit board and for instance takes the form of mass-produced goods from the electronics trade—controllable by hand by way of the usual slides—and thus a simply constructed means for reversing the direction of rotation, is created.

The ON/OFF trigger and the direction of rotation reversal are designed such that on the one hand, when the ON/OFF trigger is depressed, the direction of rotation reversing means is blocked and cannot be moved, and on the other, the ON/OFF trigger is blocked and cannot be pressed into the activation position, when the direction of rotation reversing means is in its middle position, which is the recommended position for transport.

The charging contact tongues soldered to the circuit board protrude through openings in the lower end of the grip and are contacted, in the charging position, by counterpart contacts of the charging shell; no additional cords or coupling plugs have to be actuated.

Depending on the direction of rotation of the motor, a green or red light-emitting diode soldered to the circuit board lights up. These light-emitting diodes are visible through openings in the housing that are covered by a transparent plastic part acting as a window.

The gearbox is simultaneously the outer wheel of the planetary gear. As a result, one additional component is dispensed with, and the device becomes slender and compact, with a small corner size (spindle axis to the outer contour). The tooth cross sections or the tooth height of the outer wheel of the planetary gear (the gearbox) are at the same a stop for a securing disk, which serves as an axial securing means and forms the boundary, toward the motor, of the planet wheels of the first stage. The securing disk has two vanes, protruding past its circumference, which can be locked in the manner of a bayonet mount in two corresponding indentations on the gearbox and can be secured against axial release by rotation in an adjoining annular groove. At the same time, this serves as a securing means during shipping, for the drives that are deliverable separately. The disk is held in the built-in state by its vanes between the motor and the gearbox. A securing disk with protruding, angled vanes that can be secured in the indentations by being pressed into them can also be used.

The planetary gear is provided with an auto-locking system, that is, by the self-locking drive spindle upon rotation thereof by force exerted from outside. Its gearbox has axial extensions at the top and bottom toward the motor, with an annular groove and an annular bead. This annular groove is engaged by annular beads of the half-shells of the motor housing, which have a complementary counterpart profile. Thus the gearbox is received and axially fixed without further components such as screws, rivets, or overlooking tongues. Laterally, where the gear has recesses between these extensions, axial counterpart extensions of the half-shells protrude into the recesses. This arrangement serves to secure the gearbox against relative rotation with respect to the motor housing—without using separate components. The axial extensions are asymmetrical, to assure unambiguous assembly.

The gearbox, the circuit board with the battery, motor, light-emitting diodes and electrical elements, as well as the switch pushbutton with the contact plate and springs and the transparent plastic part are placed in a first half-shell, closed with the second half-shell, and closed with only four identical screws and thus completely assembled and result in a very inexpensive embodiment.

The compact design makes it possible to hold the device in one hand, at the front of the gearbox or on the adjoining motor housing, in such a way that a screw can be held against the bit with the index finger, and at the same time the large-area ON/OFF trigger can be comfortably operated with the other fingers, and the free hand can furthermore hold the workpiece.

Because of the large-area rubber sheathing with a bumpy surface over the entire grip region, the battery-operated screwdriver fits especially securely in the user's hand.

DRAWINGS

The invention is described below in further detail in terms of an exemplary embodiment and the associated drawings.

Shown are.

DESCRIPTION OF THE EXEMPLARY EMBODIMENT

Figure 1:
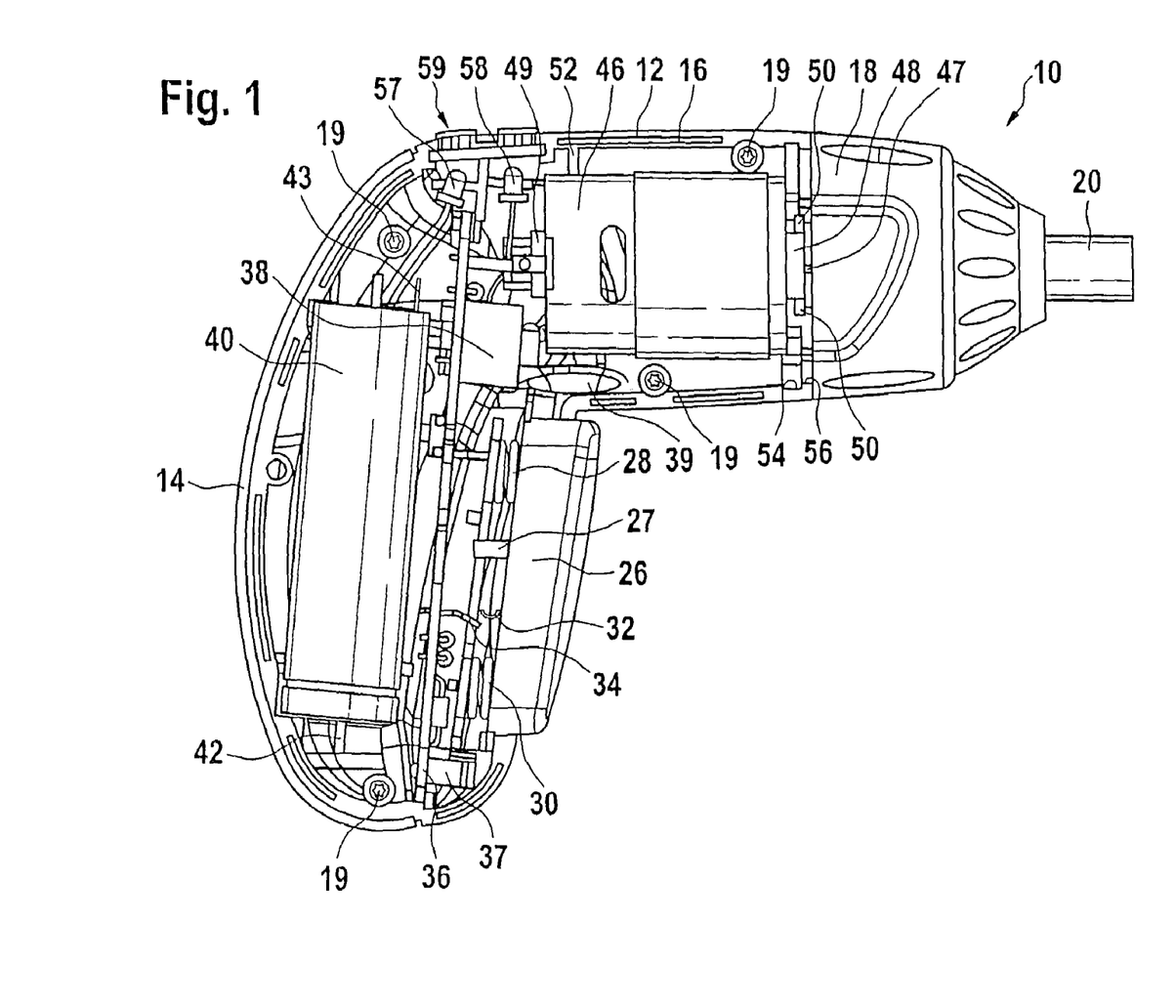
FIG. 1, a side view of the partly open battery-operated screwdriver.
Figure 2:
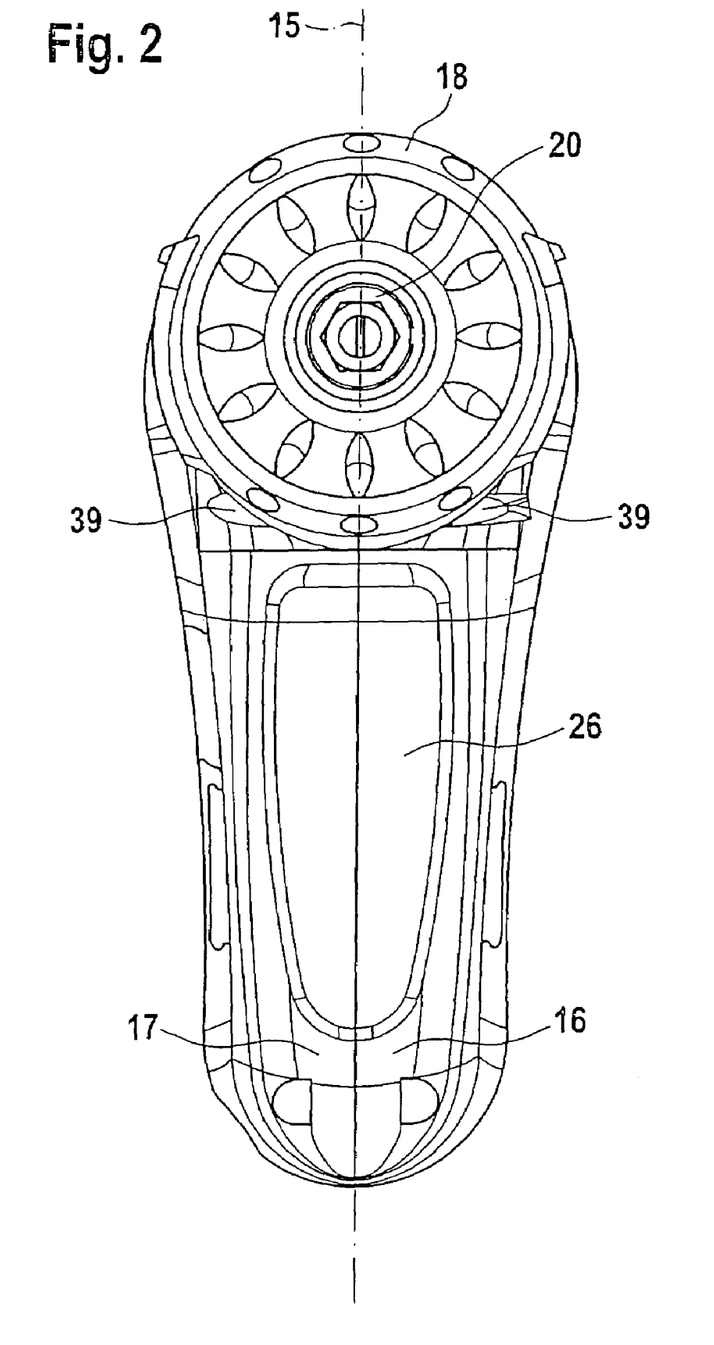
FIG. 2, a front view of the battery-operated screwdriver.

FIG. 1 shows a pistol-shaped battery-operated screwdriver 10, with a motor housing 12 aligned in the screwing direction and with a grip 14 at an angle from the motor housing. The motor housing 12 and grip 14 are formed of two half-shells 16, 17, which can be joined together, braced tightly against one another, in a center plane 15. To that end, four screws extend through bores in one half-shell 17 into four screw domes 19 of the other half-shell 16 and hold the two half-shells firmly against one another.

An ON/OFF trigger 26 is located so that it extends over merely the entire internal length of the grip 14. Toward the tool, the ON/OFF trigger 26, together with a screwed-on contact plate 32 and in conjunction with counterpart contacts 34 fixedly located in the tool, forms an ON/OFF switch, making a separate, commercially conventional boxlike standard switch or button unnecessary. The ON/OFF trigger 26, because of its special length, makes it convenient to switch the battery-operated screwdriver ON and OFF, even in complicated holding positions of the battery-operated screwdriver 10. On its long sides, it is provided with lateral support tongues 27 that enter into the grip 14 and form a secure guide on corresponding counterpart faces of the half-shells 16, 17 and make precise, play-free motion back and forth possible.

Via two hard compression springs 28, 30, the ON/OFF trigger 26 is elastically braced on the grip 14, so that once the tool is switched on, the springs 28, 30 automatically move the ON/OFF trigger 26, when it is let go, into its OFF position and disconnect the contacts 32, 34 and stop the motor motion. The actuation stroke is limited by stops, not identified by reference numerals, and at a length of 1 to 4 mm is very short and easy to control.

To enable the ON/OFF trigger 26 to move into the motor housing 12, a suitable opening 29 is provided, half of which is located in each of the half-shells 16, 17; this opening closely surrounds the ON/OFF trigger 26 in a way that guides it in shaftlike fashion. On its face end toward the grip 14, the ON/OFF trigger 26 has one longitudinally protruding tongue at the top and another at the bottom; these tongues protrude past the opening 29 and are braced from inside on its edge and firmly hold the ON/OFF trigger 26, bracing it, thereon in the OFF position and keep it from being released from the housing 12.

The counterpart contacts 34 associated with the contact plate 32 are located on an elongated circuit board 36, extending in the interior of the grip 14, diametrically opposite the contact plate 32 and in its reciprocation region. The circuit board 36, in its lower region, also has two symmetrically located charging contact tongues 37, which extend at a right angle from the plane of the circuit board 36 and then on each end form outward-angled, large supporting surfaces. These surfaces pass through each half-shell 16, 17 symmetrically to the center plane 15 in the lower end of the grip 14. At each passage point, they are each embedded in a respective indentation, or "countersunk", inside the grip contour and are accessible to the outward-protruding charging contacts 23 of the charging shell 22, which fit over them in the charging state when placed on the charging shell 22 and are braced, securely contacted, because of their resilient disposition.

The circuit board 36 also has interference resistors and capacitors, not identified by reference numeral, approximately centrally, flat and near the surface, and in its upper region it also has the slide switch 38, as well as two light-emitting diodes 57, 58 on the upper end for visually indicating the direction of rotation.

The circuit board 36 is located with its long side parallel to the grip 14 and its short side transverse to the center plane 15 and is thus clamped without play in groovelike recesses, not identified by reference numeral, in the two half-shells 16, 17 in such a way that it is braced from inside against the half-shells 16, 17 and as a result forms a reinforcing rib in the grip 14. A lithium-ion cell, with its familiar advantages, is placed as a battery 40 in the grip 14, parallel to the circuit board 36; this cell is embraced in tonglike fashion and positionally secured in the assembled state by the two half-shells 16, 17 and is thus integrated with the strength structure of the housing 12. At the top and bottom, the battery 40 has a respective contact plate 42, 43, which serves as a soldering lug and is wired to the circuit board 36.

Above the ON/OFF trigger 26—in the nip between the angled grip 14 and the motor housing 12—a slide button 39 is located transversely to the center plane 15 of the motor housing 12 and can be displaced back and forth through lateral openings, not identified by reference numeral, in the half-shells 16, 17. The slide button 39, with an approximately central recess not identified by reference numeral, extends in forklike fashion around a slide device 41 of a boxlike slide switch 38 fixed in the upper region of the circuit board 36. The slide device 41 seated on the slide switch 38 is adjustable via the slide button 39 into the outermost left and right side positions and into a middle position.

A direct-current motor 46 in the front region of the motor housing 12 is embraced in tonglike fashion by the half-shells 16, 17 after they have been installed and is held in its working position without play, oriented in an aligned fashion, parallel to the gearbox 18 placed in the motor housing 12. The motor 46 has one rear and one front steplike motor collar 48, 49, from which the rear and front ends, respectively, of the motor shaft 45 emerge. The motor 46 is supported, centered in braced fashion, via its front and rear motor collars 48, 49 in corresponding bearing-blocklike ribs of the half-shells 16, 17. The front end 47 of the motor shaft 45 is provided with a flat face or a double flat, in particular by creative shaping, and thus in the installed position engages a corresponding flattened recess of an input pinion 66 of the gear 65, designed as a planetary gear, that is located in the gearbox 18. A easily assembled force-locking coupling with a wide dimensional tolerance is thus created, and the motor 46 with the gear 65 or the gearbox 18 can easily be put together and placed in put-together form, for further installation, into one of the half-shells 16, 17.

On the face end, the two half-shells 16, 17 embrace the gearbox 18 in tonglike and form-locking fashion, the gearbox being installed as a separate cylindrical structural group, and hold it firmly without play. In two axial, tonguelike, partly cylindrical extensions 60 that extend toward the motor housing 12, the gearbox has a housing annular groove 54, which is bounded by an annular bead 55. The annular bead 55 engages a fitting counterpart annular groove 56 on the inside of the face end of the half-shells 16, 17 of the motor housing 12, and fitting counterpart annular beads 53 of the half-shells 16, 17 fit in form-locking fashion into the housing annular groove 54 of the gearbox 18.

Counterpart extensions 61 bent at an angle, crosswise to the longitudinal direction of the motor housing 12, engage the two asymmetrical recesses between the two extensions 60 of the gearbox 18 in a way that is secure against incorrect installation and without play; these counterpart extensions also in bearing-blocklike fashion brace the motor collar 58 of the motor 46 in centering fashion, so that this collar is likewise integrated with the strength structure of the motor housing 12. Separate fastening elements, such as screws or the like, are then unnecessary. This makes for easier assembly with a reduced number of individual parts.

At the top rear, the motor housing 12 has an emplaced, transparent window 59, which extends longitudinally in the parting plane and is split in the middle. Through two openings in the half-shells 16, 17, it provides a view to one blue and one red light-emitting diode 57, 58, each of which is associated to one direction of rotation of the motor shaft 45 and light up when the direction of rotation occurs.

From the gearbox 18, which tapers at the front into a rounded cone, a power takeoff spindle 20 emerges at the front; it is designed on the face end as a hexagonal socket 21, for receiving suitable standard bits. The hexagonal socket 21 is provided with means that firmly secure an inserted screw bit or drill bit against being lost, so that a certain resistance has to be overcome by hand to remove the bit axially.

Figure 3:
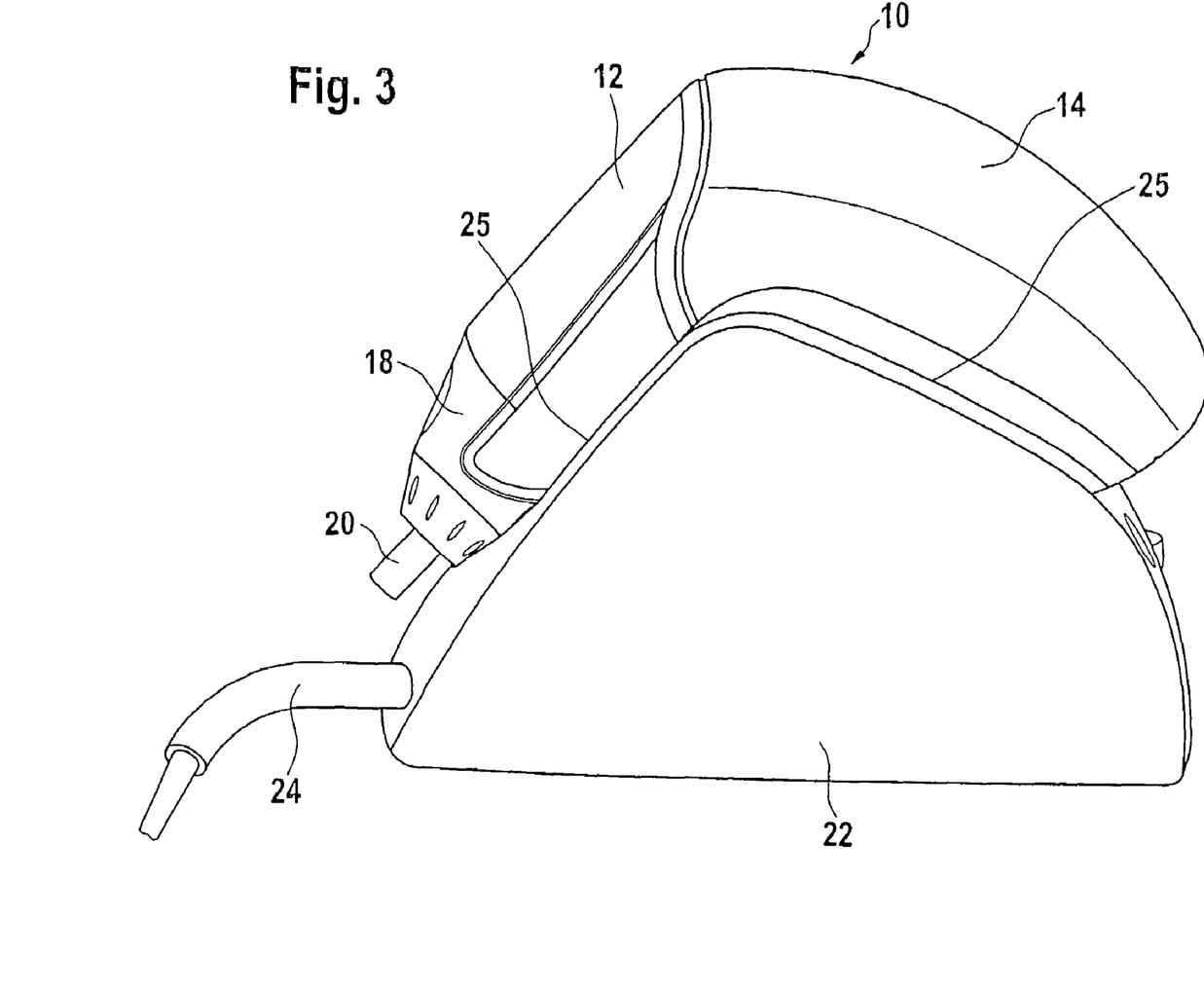
FIG. 3, a side view of the battery-operated screwdriver, positioned in a charging shell.

FIG. 3 shows a relatively narrow, boxlike charging shell 22, whose outer contour is adapted with oblique surfaces to the pistol-like inner and outer contour of the battery-operated screwdriver 10 and is indented in groovelike fashion. The battery-operated screwdriver 10 can therefore enter without play, with its inside, into beds 25 of appropriate fit for the grip 14 and for the motor and gearbox 12 and 18, and can rest in secured fashion by its own weight; the contacting between its charging contact tongues 38 and the charging contacts 23 of the charging shell 22 is especially secure.

The charging contacts 23 protrude from the contour of the charging shell 23, so that the battery-operated screwdriver 10 with its grip 14 locks into a corresponding recess in the charging shell 12 and in the process is braced by its own weight, with its charging contact tongues 37, on the resilient charging contacts 23 of the charging shell 22. Simply placing the battery-operated screwdriver 10 on the charging shell 22 immediately establishes the charging state, with an audible click.

On the left in the viewing direction, the charging shell 22 has an electrical plug contact, not identified by reference numeral, for introducing an electrical connection cord 24 for supplying power to the charging shell 22, which in its rear region, associated with the grip 14 of the battery-operated screwdriver 10, has a charge monitoring light 71 and a perpendicular insertion opening 73 for retaining a screw bit or bore bit.

With its inside, and particularly with its ON/OFF trigger 26, the battery-operated screwdriver 10 rests on the top of a charging shell 22, where on being put in place it automatically assumes a secure charging position, as long as the charging shell 22 is connected by the cord 24 to a suitable power supply.

Figure 4:
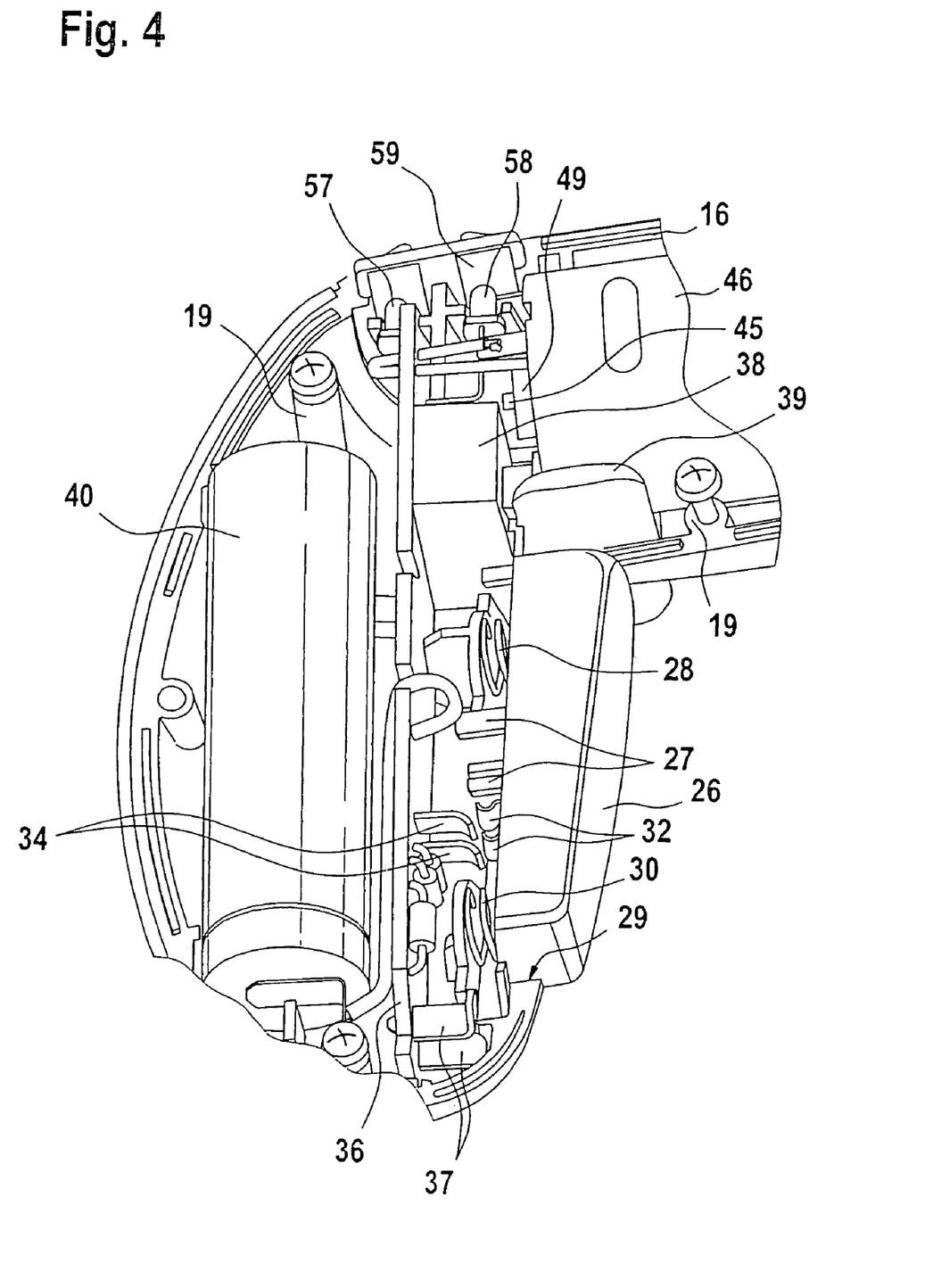
FIG. 4, an enlarged detail of FIG. 1 looking toward the switch button.

FIG. 4 shows an enlarged detail of the first half-shell 16 with the individual parts inserted as in FIG. 1; this clearly shows the design of the battery 40 with its adjacent parts and of the circuit board 36 with the parts secured to it as well as of the ON/OFF trigger 26.

Figure 5:
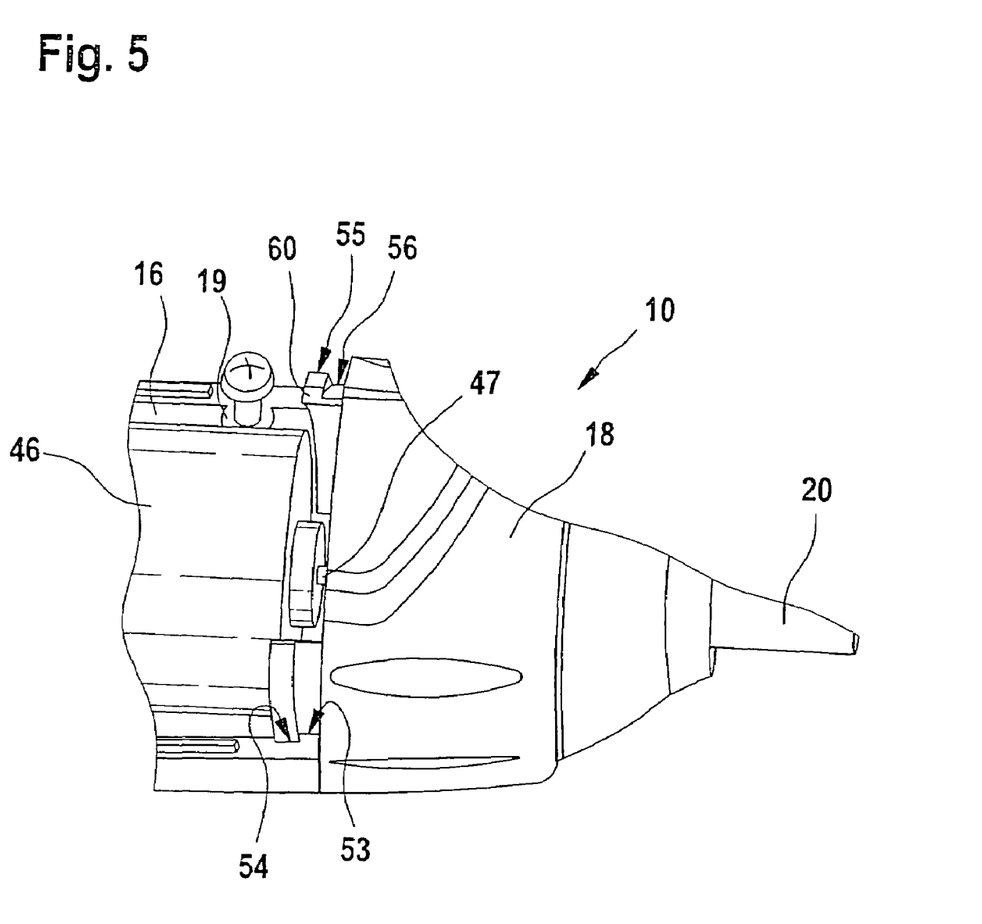
FIG. 5, an enlarged detail of the gearbox of FIG. 1.

FIG. 5 shows a detail of the front region of the battery-operated screwdriver 10, with the lower half-shell 16, looking toward the motor 46 and the gearbox 18—put in place in form-locking fashion.

Figure 6:
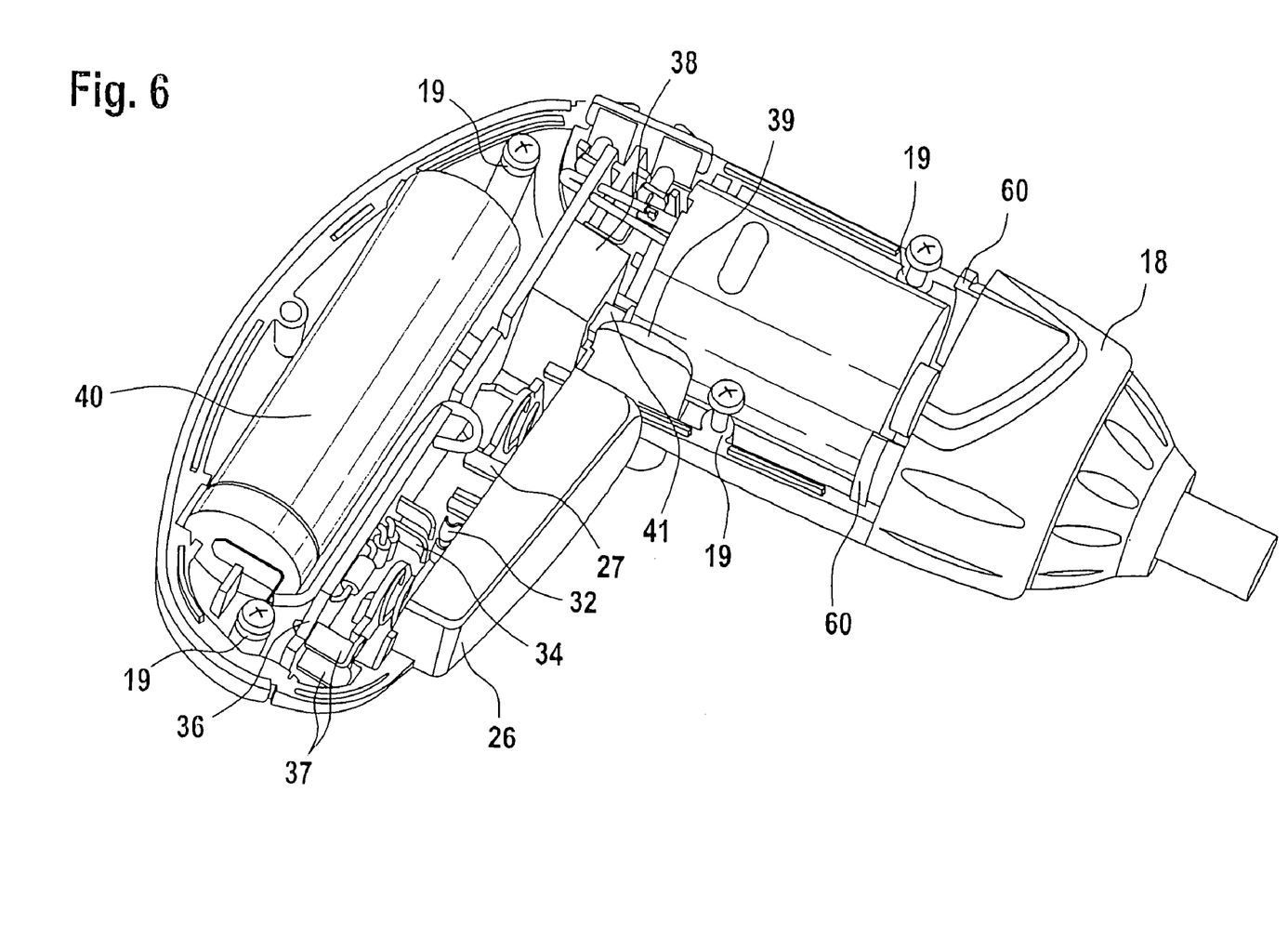
FIG. 6, a view as in FIG. 1, slightly rotated.

FIG. 6 shows a perspective view corresponding to FIG. 1, with the corresponding details of FIG. 1; beyond these details, the slide button 39 for reversing the direction of rotation can be seen more clearly, which in its middle position simultaneously forms an activation block for actuating the ON/OFF trigger 26. As a result, in this position, an unintentional actuation, for instance while the tool is being carried in a pants pocket, is not possible.

Figure 7:
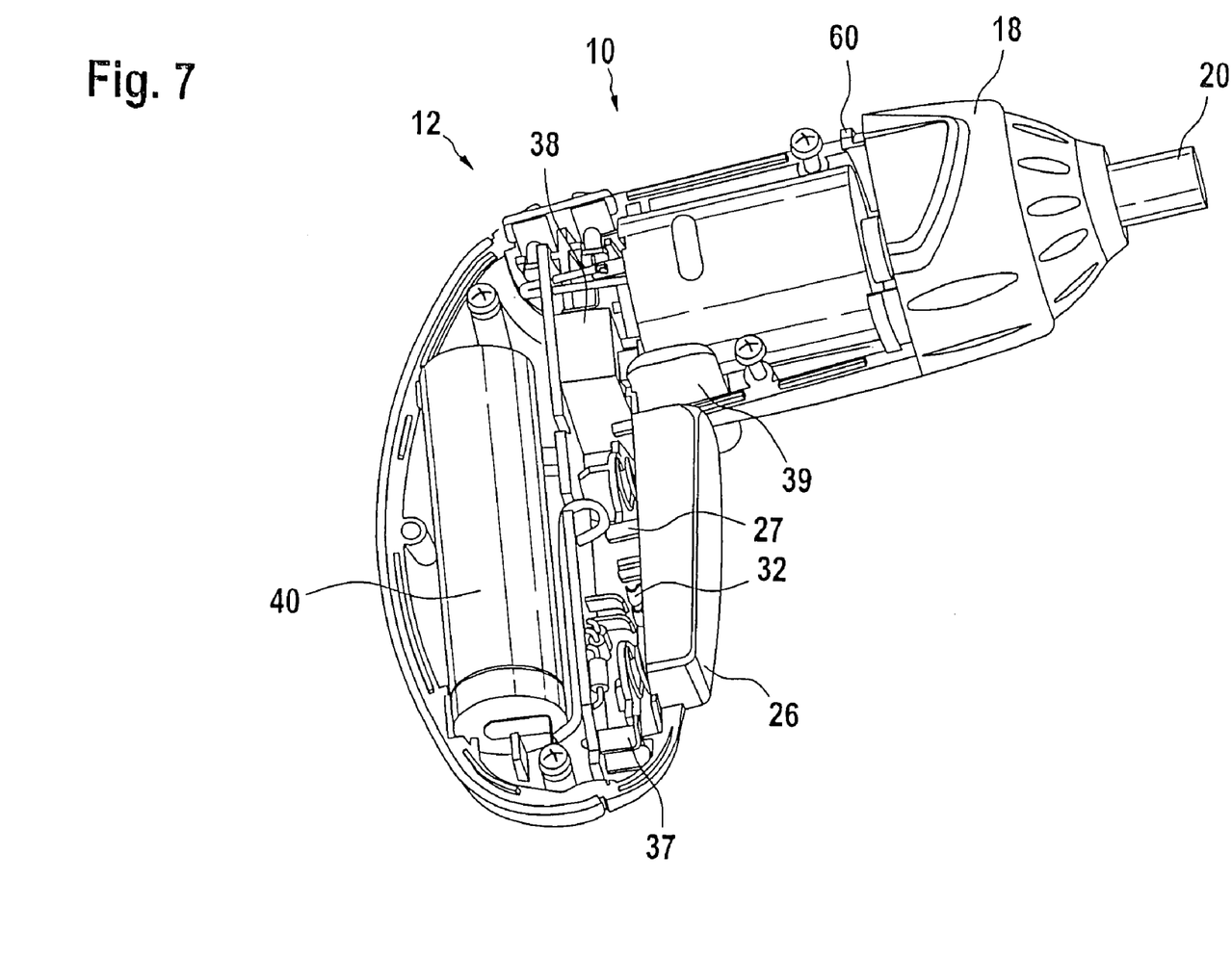
FIG. 7, a view as in FIG. 6, slightly rotated.

FIG. 7 shows a further three-dimensional view corresponding to FIGS. 1 and 6; the details described in conjunction with them will not be repeated here but are intended to improve comprehension of them.

Figure 8:
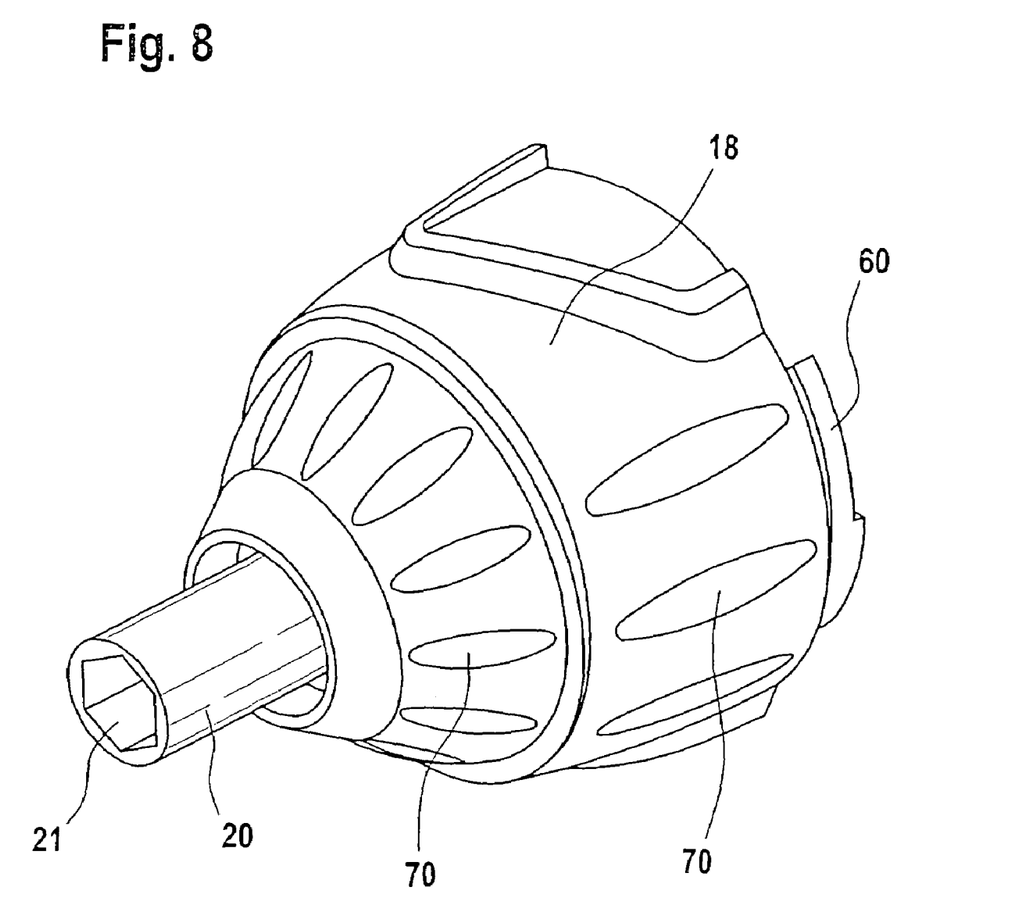
FIG. 8, a three-dimensional view of the gearbox from the front.

FIG. 8 shows the face end of the gearbox 18 as a detail, with the built-in gear 65, and the power takeoff shaft 20, protruding from the front, with the hexagonal socket 21 and the axial extensions 60, protruding to the rear from the gearbox 18, in which regular oval indentations 70 on the outside of the gearbox 18 improve its grip.

Figure 9:
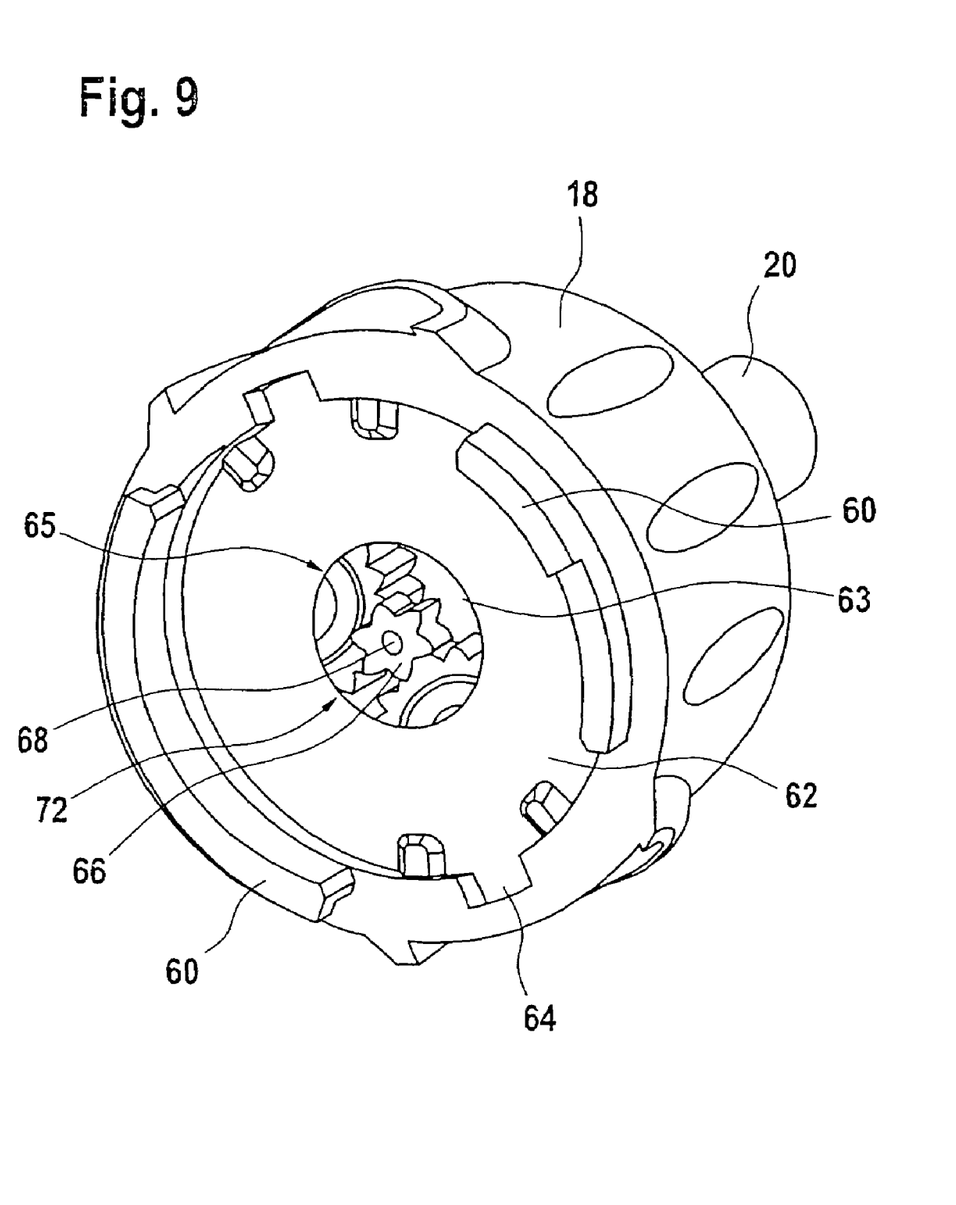
FIG. 9, a three-dimensional view of the gear from behind.

FIG. 9 shows the gearbox 18 of FIG. 8, which is cylindrical at the rear, in a view from behind; the two axial extensions 60 and their interstices, a spring disk 62 with a center opening 63, the disk being locked in the interior of the gearbox 18 and extending over its entire inside diameter, are visible.

The spring disk 62 has radially protruding vanes 64, with which it can be placed in bayonetlike fashion in corresponding recesses in the circumference of the rear end of the gearbox 18 and locked therein by rotation or wedging.

Through the center opening 63, the input shaft 66 of the gear 65 for engaging the motor shaft 47 is accessible and can be coupled to the flattened end thereof, so that its rotary slaving can be effected securely. The input shaft 66 has a center recess 68, which forms the negative shape of the flattened end of the motor shaft 47.

Figure 10:
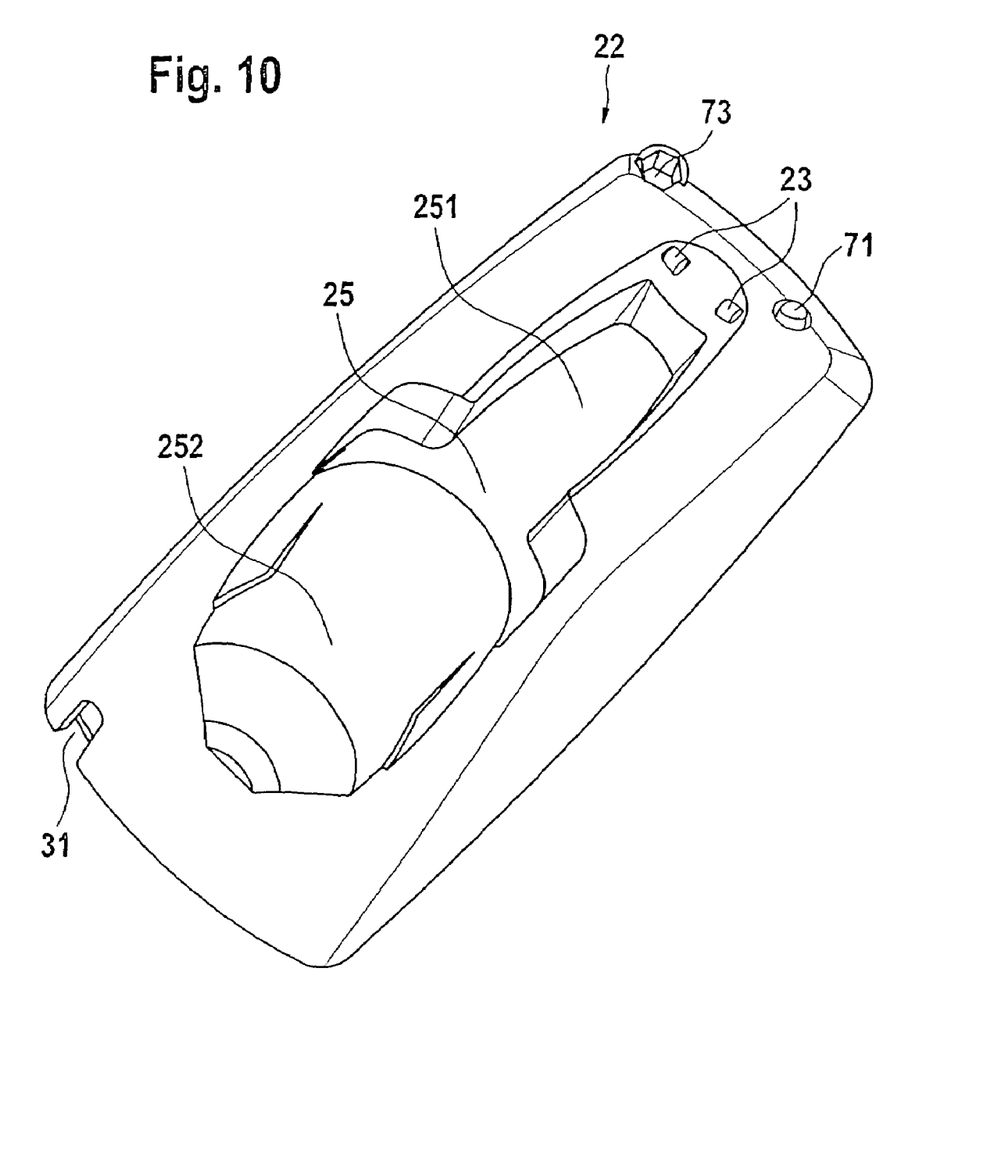
FIG. 10, a three-dimensional view of the charging shell from above.

FIG. 10 is a plan view from above on the charging shell 22, looking toward the bed 25, which is subdivided into a grip bed 251 and a gearbox bed 252, so that the battery-operated screwdriver 10 can be placed flush and virtually without play in the charging shell 22, unambiguously and in a foolproof way, such that it rests securely on it and its charging contact tongues 37 (FIGS. 1, 2, 4, 6, 7) enter into a secure contact with the charging contacts 23 of the charging shell 22.

The invention claimed is:

1. A battery-operated screwdriver (10), having a housing (12, 18) with a grip (14) with a battery (40) that in particular is fixedly built in, and with charging contact tongues (37) for charging the battery (40),
   wherein counterpart contacts (34) solidly connected to the tool, in conjunction with a contact plate (32), which is movable by means of an ON/OFF trigger (26) and is coupleable to the counterpart contacts (34) and is easily releasable upon release of the ON/OFF trigger (26), serve as ON/OFF switches.

2. The battery-operated screwdriver according to claim 1, wherein the ON/OFF trigger (26) extends over nearly the entire length of the grip (14) and is actuatable for switching ON the tool at an arbitrary point in conjunction with a short actuation stroke of 1 to 5 mm, preferably 2 mm.

3. The battery-operated screwdriver according to claim 1, wherein the ON/OFF trigger (26) is braced in prestressed fashion counter to the actuation direction on the housing (12) by means of two spiral springs (28, 30).

4. The battery-operated screwdriver according to claim 1, wherein only a single, elongated, slender lithium-ion (Li-ion) cell, as the battery (40), is located in the grip (14).

5. The battery-operated screwdriver according to claim 1, wherein its work spindle (20), instead of a chuck, has a polygonal socket (21) for the use of fitting screw or bore bits with a polygonal shank.

6. The battery-operated screwdriver according to the preamble to claim 1,
   wherein the battery (40) is positionally secured, held in tonglike fashion, in the interior of the grip (14) by means of half-shells (16, 17) of the housing (12) and serves as a means for stiffening the housing structure.

7. The battery-operated screwdriver according to claim 1, wherein a circuit board (36) serving to receive electrical contacts (32, 34) and control elements extends along the grip (14) in its interior and—held in tonglike fashion by means of the half-shells (16, 17) of the housing (12)—serves to stiffen the housing (12).

8. The battery-operated screwdriver according to claim 7, wherein the circuit board (36) has charging contact tongues (38), counterpart contacts (34) for switching a motor (46) ON, the battery (40), a slide switch (38) for reversing the direction of rotation of the motor (46), two light-emitting diodes (57, 58) for indicating the direction of rotation, and means for controlling the charging and discharging current of the battery (40).

9. The battery-operated screwdriver according to claim 1, wherein it has means (38), separate from the ON/OFF trigger (26), for reversing from clockwise to counterclockwise operation.

10. The battery-operated screwdriver according to claim 8,
   wherein for reversing from clockwise to counterclockwise operation, a slide switch (38) soldered to the circuit board (36) is provided, which is actuated via a slide button (39) that in particular is longitudinally displaceable.

11. The battery-operated screwdriver according to claim 1,
wherein when the ON/OFF trigger (26) is depressed, the slide switch (38) is blocked, and the ON/OFF trigger (26) is blocked whenever the slide button (39) is in the middle position.

12. The battery-operated screwdriver according to claim 1,
wherein after the emplacement of a circuit board (36), carrying the electrical parts or wired to them, with the battery (40), a motor (46), an ON/OFF trigger (26), a slide switch (38) with a slide button (39), two light-emitting diodes (57, 58), and a transparent plastic part acting as a window (59), as well as the emplacement of the gearbox (18) into the first half-shell (16) and the ensuing joining together above it of the second half-shell (17) and screwing the half-shells (16, 17) together with only four identical screws, the battery-operated screwdriver is fully assembled.

13. The battery-operated screwdriver according to claim 1,
wherein a large-area rubber sheathing with a bumpy structure protruding in beadlike fashion is located on each half-shell (16, 17) in the region of the grip (14).

* * * * *